United States Patent [19]

Baker et al.

[11] Patent Number: 5,332,315

[45] Date of Patent: Jul. 26, 1994

[54] APPARATUS AND SENSOR UNIT FOR MONITORING CHANGES IN A PHYSICAL QUANTITY WITH TIME

[75] Inventors: John F. C. Baker, West Midlands; John M. Phillips, Cardiff, both of United Kingdom

[73] Assignees: GEC Avery Limited, Warley-West Midlands; Industrial Electronic Automation Limited, Cardiff, both of United Kingdom; a part interest

[21] Appl. No.: 873,944

[22] Filed: Apr. 27, 1992

[30] Foreign Application Priority Data

Apr. 27, 1991 [GB] United Kingdom ............. 9109161

[51] Int. Cl.[5] ................ G01K 1/08; G01K 13/00; G01K 3/00
[52] U.S. Cl. ........................... 374/102; 374/208; 340/870.17
[58] Field of Search ................. 374/102, 208; 340/870.17

[56] References Cited

U.S. PATENT DOCUMENTS

| 4,747,413 | 5/1988 | Bloch ................... 374/163 |
| 4,781,378 | 11/1988 | Clinnin et al. . |
| 4,848,923 | 7/1989 | Ziegler et al. ............. 374/102 |
| 4,972,099 | 11/1990 | Amano et al. . |
| 4,996,909 | 3/1991 | Vache et al. ............... 374/208 |
| 5,033,864 | 7/1991 | Lasecki et al. ............ 374/151 |
| 5,149,198 | 9/1992 | Sterzer ...................... 374/208 |

FOREIGN PATENT DOCUMENTS

| 0122866 | 10/1984 | European Pat. Off. . |
| 0235534 | 9/1987 | European Pat. Off. . |
| 3139663 | 4/1983 | Fed. Rep. of Germany ...... 374/102 |
| 8502684 | 5/1987 | Netherlands . |
| 2152673 | 8/1985 | United Kingdom . |
| 2171205 | 8/1986 | United Kingdom . |
| 2173623 | 10/1986 | United Kingdom . |
| 2229822 | 10/1990 | United Kingdom . |
| 2234593 | 2/1991 | United Kingdom . |
| 89/03020 | 4/0689 | World Int. Prop. O. . |
| 86/06162 | 10/1986 | World Int. Prop. O. . |
| 92/03705 | 3/1992 | World Int. Prop. O. . |

Primary Examiner—Diego F. F. Gutierrez
Attorney, Agent, or Firm—Jacobson, Price, Holman & Stern

[57] ABSTRACT

Apparatus for monitoring changes in a physical quantity with time comprises a reader unit and at least one sensor unit containing electronic components arranged to measure said quantity at predetermined time intervals and to store measurement data with corresponding time data. Each sensor unit also contains communication means for transferring said measurement data and said time data from the sensor unit to the reader unit, and the sensor unit also contains an inductive coupling means to receive energy from the reader unit to power the communication means. Each sensor unit is encapsulated with a food grade plastic and is typically the size of a credit card, thereby providing a small and relatively inexpensive temperature monitoring device for use in the transport and storage of foodstuffs.

31 Claims, 1 Drawing Sheet

APPARATUS AND SENSOR UNIT FOR MONITORING CHANGES IN A PHYSICAL QUANTITY WITH TIME

FIELD OF THE INVENTION

This invention relates to apparatus for monitoring changes in a physical quantity with time. The apparatus may be used, for example, to monitor the temperature of foodstuffs in storage and transit.

BACKGROUND OF THE INVENTION

Food hygiene regulations impose increasingly strict requirements for the handling and storage of foodstuffs, and it is desirable to be able to establish reliably that, over a given period, the correct storage temperature has been maintained to suppress the growth of bacteria, for example. Various devices are available which can be placed in the food container, for example a vehicle, to accompany the food and to measure and record the temperature within the container at predetermined intervals, recording at the same time the date and time of the measurement. When the food reaches its destination, the temperature and time measurements recorded in the device are read into a computer by connecting the device to a reader unit.

In order to ensure sufficient battery power is available to operate data measuring and recording functions reliably over a long period, and to permit transfer of the data to the reader unit, known devices generally are relatively bulky and costly to manufacture. This limits their application, since they occupy space which would otherwise be occupied by foodstuffs, and the cost of including one or more of the devices with every load of foodstuffs can be prohibitive. As a result, therefore, most existing devices tend to be used for random testing, travelling with selected loads, rather than for monitoring every load and thus enabling responsibility for spoiled foods to be established, or at least to be avoided, by the user of the devices. There is therefore a need for a temperature monitoring system which includes small and relatively inexpensive temperature monitoring devices which can travel with every vehicle load, or even with every pallet load within the vehicle.

The specification of U.S. Pat. No. 4,972,099 discloses a portable sensor card in which an external physical phenomenon can be sensed and the sensed value subjected to signal and data processing and the results of processing stored, and in which the stored data can be read out to an external device. More particularly this publication teaches a sensor card comprising a single card substrate on which are mounted a sensor, an integrated circuit having a memory, and an output terminal. The sensor card is used to detect and record the temperature of the environment of food or living things during transportation and includes a sound-emitting element for generating a predetermined warning tone when the microprocessor detects a sensed temperature outside allowable limits. The sensor card incorporates its own power supply, in the form of a battery imbedded within the card substrate, and has an external connection terminal for connection to an external device such as a personal computer. This sensor card is relatively bulky due to the imbedded battery which needs to meet all its energy requirements. Furthermore, the external connection terminal and the projecting sound-emitting element both provide recesses in which foodstuffs, dirt and associated micro-organisms will accumulate to the detriment of future consignments.

SUMMARY OF THE INVENTION

The present invention provides, in one aspect, apparatus for monitoring changes in a physical quantity with time, including a reader unit and at least one self-contained sensor unit arranged to measure said quantity at predetermined time intervals and to store measurement data with corresponding time data, the or each sensor unit having communication means for transferring the measurement and time data to the reader unit. In order to minimise the bulk and cost of the sensor unit, and to avoid traps for foodstuffs, dirt, micro-organisms and the like, the sensor means contains inductive coupling means to receive energy from the reader unit to power the communication means.

Preferably, the communication means is arranged to transmit data to the reader unit by presenting a load to the reader unit whilst receiving r.f. power from the reader unit, said communication means being arranged to transmit said data by varying the load which the sensor unit presents to for the reader in accordance with the data to be transmitted.

The electronic components in the or each sensor unit may comprise measuring means for measuring the quantity, timing means for controlling operation of the measurement means to obtain measurements at predetermined intervals and for providing time data relating to each of the measurements, and storage means for storing the measurement data and associated time data.

The physical quantity will typically be temperature, the sensor unit incorporating a thermocouple, for example, but other physical quantities may also be monitored with apparatus in accordance with the invention. For example, sound intensity may be monitored, by incorporation of a suitable transducer in the sensor unit, permitting monitoring of noise levels in public places or within factories to determine whether regulations are being observed.

The sensor unit preferably comprises a plastics body in which the electronic components and the communications means are hermetically enclosed, preferably by encapsulation. Using technology currently employed in the manufacture of integrated circuit cards or "smart cards", the unit may be made relatively small, for example having, in plan, a shape and size similar to the ISO (International Standards Organisation) standard bank or credit card, with a thickness less than 10 mm, preferably less than 6 mm, for example 5 mm. Such a size and configuration would permit the unit to be inserted in packaged food to monitor temperature without significantly reducing space available for the food, the tiny power requirements of the internal electronic measuring and recording functions being provided by a very small internal battery which can be rechargeable through the inductive coupling.

In certain applications, for example for monitoring temperature in a cold storage room, it may be desirable to guard against removal of the sensor unit to another location (for example to a refrigerator) in order fraudulently to mask failure of the cold storage room by maintaining a temperature at or below a legally-required maximum. Accordingly, for such applications, the apparatus may comprise at least one reader unit co-operable with the sensor unit, or one of the sensor units to supply r.f. power thereto, such that separation of the sensor unit or the co-operable one of the sensor units from the reader unit supplying the r.f. power may be detected from data stored in the sensor unit. The reader unit supplying the r.f. power is preferably arranged to couple inductively with the sensor unit, whereby the stored data may be affected thereby. If, for example, the electronic components in the sensor unit are powered only by energy received from the reader unit by inductive coupling therewith, the sensor unit will only be operative to store new data when inductively coupled with the reader unit.

By powering data transfer to the reader unit with inductively-coupled power from the reader unit, the internal battery in the sensor unit operating the other electronic components may be kept small, thus permitting the size of the sensor unit to be reduced. Encapsulation of integrated circuit components within a plastics body permits the sensor unit to operate in environments which would be deleterious to electronic components, and ensures a low thermal mass which, in the case of temperature monitoring, results in a rapid response to temperature change without the need for external temperature probes. The reduction in size to, for example, a thick credit card size, also reduces thermal mass and reduces the volume occupied by the sensor unit, thus enabling it to be located where monitoring is required, without the need for external probes and the like. For example, sensor units in accordance with the invention may be packed with foodstuffs to monitor temperature not only of complete vehicle loads, but also of individual pallet loads forming part of the vehicle load, and even of high value packages forming part of pallet loads. The cost of the sensor units may be substantially less than known temperature monitoring devices, thus permitting their use for monitoring every load rather than sampled loads. The reduced size also simplifies coupling with a reader unit, precise alignment with the reader unit being less important than with existing monitoring devices, rendering the extraction of data via the reader unit to, for example, a computer much easier. Typically, the sensor unit will be "initialised" by the reader unit, upon entry of a security code, for example, to clear existing data and to commence the data recording operation. Each reader unit may record in the sensor unit its own individual "signature" code for monitoring purposes.

Energisation of data may be carried out by the electronic components in the sensor unit, for security purposes and/or to compress the data to reduce storage requirements or increase the amount of data which can be stored. In one data compression technique, only significant changes in temperature are recorded, so that repeated readings of the same temperature are not stored. The change necessary to trigger storage of new data may be varied. The data recording frequency may be varied according to circumstances. For example, different food types may require different temperature recording frequencies.

The invention accordingly comprises the features of construction, combinations of elements and arrangement of parts which will be exemplified in the construction hereinafter set forth, and the scope of the invention will be indicated in the claims.

DESCRIPTION OF THE PREFERRED EMBODIMENTS

Figure 1:
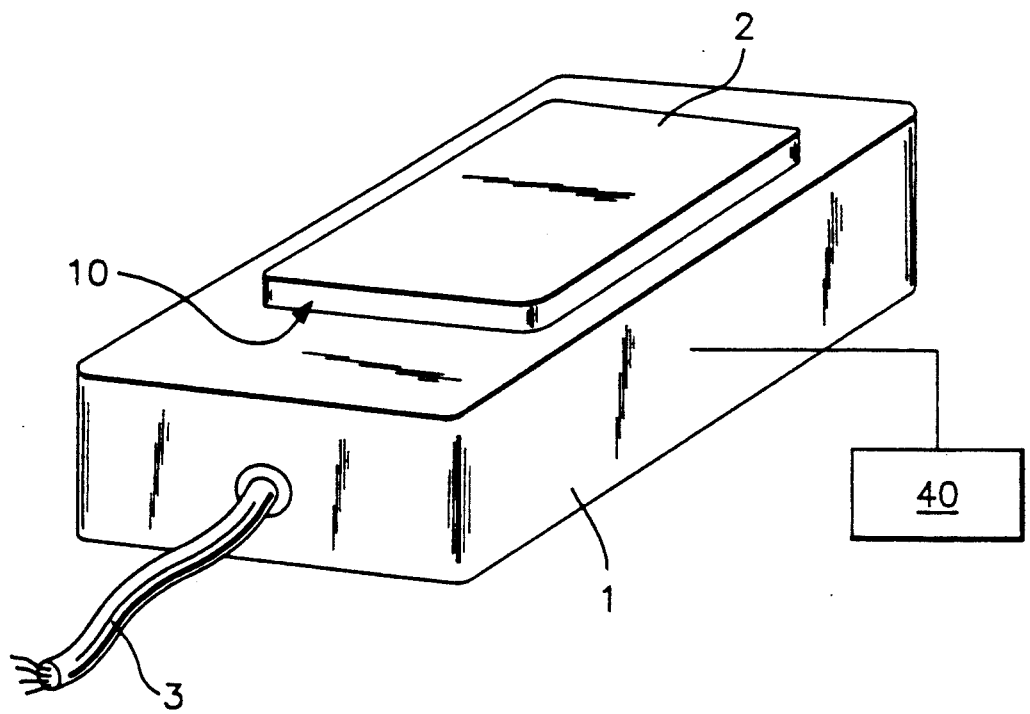
FIG. 1 is a perspective view of apparatus according to one embodiment of the invention.

The apparatus shown in FIG. 1 consists of a reader unit 1 upon which rests a self-contained sensor unit 2. In the position shown, the reader unit and sensor unit communicate with each other by inductive coupling, for example in the manner described in our UK Patent No. 2 173 623, which can be designed to function irrespective of the relative orientation between the sensor unit and the reader unit. A cable 3 connects the reader unit 1 to a personal computer and to a power supply, so that power is available for operation of the reader unit 1, and the data received from the sensor unit 2 can be passed by the reader unit 1 to the personal computer for further processing and, if desired, printed output. In use, the sensor unit 2 is first initialised by the reader unit 1 to delete existing stored data, to correct the internal clock, to calibrate the temperature measuring elements therein by reference to an accurate measuring device 40 in the reader unit (after a suitable delay for temperature equalisation) and to start the new data recording sequence. The reader unit 1 may send to the sensor unit 2, for storage therein, data relating to the batch of goods with which the sensor unit is to be placed, and control data specifying the measurement intervals to be applied, according to the nature of the goods, for example. A security code permanently stored within the sensor unit 2 may be compared with a code entered into the computer via its keyboard. If the codes do not match, the sensor unit 2 may be arranged to ignore further instructions and data sent thereto by the reader unit 1.

Figure 2:
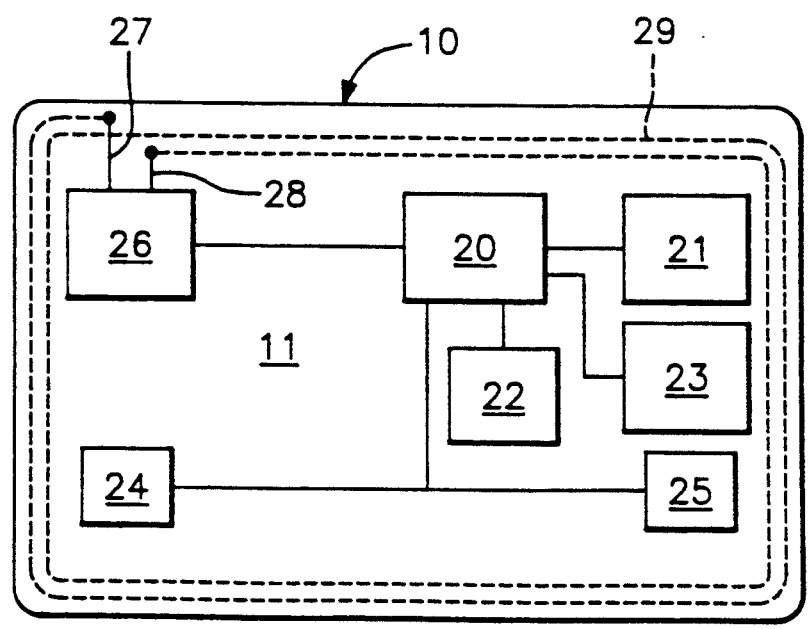
FIG. 2 is a block diagram of the sensor unit forming part of the apparatus shown in FIG. 1.

Referring now to FIG. 2, the sensor unit comprises a smooth, featureless body 10 formed of a food-grade plastic in which are encapsulated a substrate 11 bearing a printed circuit which appropriately interconnects a central processor 20, a memory 21 in the form of an EEPROM, a battery 22 (for example a lithium cell), a clock circuit 23, and two thermocouple devices 24 and 25. The components 20 and 23, for example, may form a single integrated circuit. A communications circuit 26 is also encapsulated in the body 10 and is connected to the central processor 20 and by connectors 27 and 28, on one side of the substrate 11, to an inductive coupling means defined by an inductive coil 29 extending around the periphery of the substrate on the opposite side from the connectors 27 and 28. The coil 29 thus provides inductive communication between the communication circuit 26 and the reader unit 1, thereby achieving a contactless interface. The two thermocouple devices 24 and 25 are spaced apart in the sensor unit to compensate errors due to local variations in temperature. Time data (including the date) is stored with corresponding temperature measurement data in the memory 21 at the desired predetermined intervals, after initialisation of the unit as hereinbefore described. When the sensor unit 2 and its associated load reaches the destination, the card is again placed on a reader unit and, after clearance of security codes as already described, the data from the memory 21 is transmitted via the communications circuit 26 to the reader unit 1.

The internal battery 22 can be very small as it only provides power to the central processor 20, the memory 21, the clock circuit 23 and the thermocouple devices 24 and 25. The duty cycle of the battery 22 is typically very low as the sensor unit is programmed to operate only for very short periods at relatively long intervals - for example, for 120 milliseconds every few minutes.

When the sensor unit 2 is inductively coupled with the reader unit 1, the inductive field is arranged to over-ride the battery 22 so that the total energy demand for the sensor unit 2 will be derived from the inductive coupling which can also be used to recharge the battery 22.

The coil 29 would typically comprise about 15 turns and be formed as a printed circuit on the reverse face of the substrate 11. Preferably the coil 29 is tuned, for instance by use of a suitable capacitor, to a narrow range of frequencies to optimise the efficiency of the contactless interface.

In certain applications, for example for monitoring temperature in a cold storage room, it is desirable to guard against removal of the sensor unit 2 to another location (for example to a refrigerator) in order fraudulently to mask failure of the cold storage room in maintaining a temperature at or below the legally-required maximum. Accordingly, for such applications, the apparatus may comprise at least one reader unit co-operable with the sensor unit 2, or one of the sensor units,. to supply r.f. power thereto such that separation of the sensor unit (or the coupled one of the sensor units) from the reader unit supplying r.f. power can be detected from data stored in the sensor unit. The unit supplying the r.f. power may be arranged to couple inductively with the sensor unit 2, whereby the stored data may be affected thereby. If, for example, the electronic components in the sensor unit are powered only by energy received from the inductive coupling, the sensor unit is only operative to store new data when so inductively coupled, and the inductive coupling provides the ability to detect separation from the r.f. power supply.

For those applications where it is essential to keep a record of the times at which the sensor unit 2 is inductively coupled with a reader unit 1, this information may conveniently be stored in the memory 21 thereby generating a history of such inductive couplings.

For use with foodstuffs or livestock, for instance, the sensor unit 2 is totally hermetically sealed. The body 10 is formed from a food grade plastic and would either be formed in two or more moulded pieces welded together (for instance by a peripheral ultrasonic weld), or be an encapsulation for all of the electronic components. Suitable food range plastics are the polyolefines and particularly high density polypropylene. One end of the body 10 may be extended to define an attachment, such as a hook or a hole for a fixing, whereby the sensor unit 2 may be positively secured to a pallet of foodstuffs or the like.

Each sensor unit 10 is unique and will require individual calibration. To this end the central processor 20 of each sensor unit may be programmed to perform a self-test of the sensor unit. In this manner groups of sensor units may be calibrated by subjecting them to a predetermined temperature and using a software instruction via the contactless interface to effect precise calibration of the temperature sensing means within the sensor unit. Similarly, software instructions may be used to alter the programme sampling sequence of any sensor unit thereby adjusting the period of measurement and the timing of subsequent measurements to suit the user's requirements.

What we claim is:

1. Apparatus, for monitoring changes in a physical quantity with time, said apparatus including a reader unit and at least one sensor unit, said reader unit including an r.f. power source, said sensor unit comprising a plastic body hermetically encapsulating a means arranged for measuring said physical quantity at predetermined time intervals and a data storage means arranged to store measurements of said physical quantity with corresponding time data, said plastic body also hermetically encapsulating communication means for transferring said measurements of said physical quantity and said time data from said sensor unit to said reader unit, and said sensor unit also carrying inductive coupling means arranged to receive energy from said r.f. power source of said reader unit to power said communication means.

2. Apparatus, as claimed in claim 1, wherein aid communication means is arranged to transmit data to said reader unit by presenting a load to the reader unit whilst receiving r.f. power from the reader unit, said communication means being arranged to transmit said data by varying the load which said sensor unit presents to the reader unit in accordance with the data to be transmitted.

3. Apparatus, as claimed in claim 1, wherein said plastic body also hermetically encapsulates a timing means for controlling operation of said means for measuring said physical quantity and for providing said time data relating to each of said measurements.

4. Apparatus, as claimed in claim 3, wherein said measuring means is arranged to measure temperature.

5. Apparatus, as claimed in claim 1, wherein said plastic body additionally encapsulates a battery for providing power for said measuring means and said data storage means.

6. Apparatus, as claimed in claim 1, wherein detection means are arranged to sense separation of said sensor unit from said reader unit, and said storage means is also arranged to store data regarding said separation.

7. Apparatus, as claimed in claim 6, wherein said detection means is said inductive coupling means.

8. Apparatus, as claimed in claim 7, wherein said sensor unit is arranged to be powered only by energy received by said inductive coupling means and is only operative to store new data when inductively coupled with said reader unit.

9. Apparatus, as claimed in claim 1, including detection means arranged to sense separation of said sensor unit from said reader unit, and said data storage means is also arranged to store data regarding said separation.

10. Apparatus, as claimed in claim 9, wherein said detection means is said inductive coupling means.

11. Apparatus, as claimed in claim 1, wherein said inductive coupling means is arranged such that data may be communicated from said sensor unit to said reader unit irrespective of their relative orientation.

12. A sensor unit, for monitoring changes in a physical quantity with time, comprising a body formed of a food-grade plastic, a means arranged for measuring said physical quantity at predetermined time intervals hermetically sealed within said body, a data storage means arranged to store measurements of said physical quantity with corresponding time data hermetically sealed with said body, communication means for transmitting said measurements of said physical quantity and said time data, said communication means being hermetically sealed within said body, and inductive coupling means arranged to receive energy to power said communication means.

13. A sensor unit, as claimed in claim 12, wherein said inductive coupling means is hermetically sealed within said body.

14. A sensor unit, as claimed in claim 13, wherein said inductive coupling means is a coil encapsulated near the periphery of said body.

15. A sensor unit, as claimed in claim 14, wherein said electronic components and said communications means are positioned within said coil.

16. A sensor unit, as claimed in claim 14, wherein said body has a thickness of less than 10 mm.

17. A sensor unit, as claimed in claim 16, wherein said body has a thickness of less than 6 mm.

18. A sensor unit, as claimed in claim 16, wherein said body is substantially the same shape and size as an ISO (International Standards Organisation) bank or 19. A sensor unit, as claimed in claim 12, wherein the body is formed from a polyolefine.

20. A sensor unit, as claimed in claim 12 wherein the body is formed from a high density polypropylene.

21. A sensor unit, for monitoring changes in a physical quantity with time, comprising:
a plastic body having a smooth exterior surface,
a measuring means arranged for measuring said physical quantity,
a clock circuit arranged to provide time data,
a processor arranged to operate said measuring means for a very short time at relatively long intervals,
a data storage means arranged to record the measurements of said physical quantity and corresponding time data,
a battery arranged to provide battery power to said measuring means and said clock circuit and said processor and said data storage means,
a communication means for transmitting data from said data storage means to a reader unit, and
an inductive coupling means for receiving r.f. power from said reader unit whenever said inductive coupling means is inductively coupled with said reader unit, said inductive coupling means being arranged to couple said r.f. power to said communication means,
and said measuring means, said clock circuit, said processor, said data storage means, said battery, said communication means and said inductive coupling means are all completely and hermetically sealed within said plastic body.

22. A sensor unit, as claimed in claim 21, in which said communication means is arranged to transmit data from said data storage means to said reader unit through said inductive coupling means.

23. A food temperature recording unit comprising:
a plastic body having a smooth exterior surface,
a temperature measuring means arranged for measuring temperature close to said smooth exterior surface,
a clock circuit arranged to provide time data,
a processor arranged to operate said temperature measuring means for a very short time at relatively long intervals,
a data storage means arranged to record the measured temperature and the corresponding time data,
a first power source arranged to power said temperature measuring means and said clock circuit and said data storage means,
a communication means for transmitting data from said data storage means to a reader unit positioned outside said body, and
an inductive coupling means arranged for receiving power from a second power source outside said body and arranged to couple said power to said communication means,
and said plastic body completely and hermetically surrounds said temperature measuring means, said clock circuit, said processor, said data storage means, said first power source, said communication means and said inductive coupling means.

24. A food temperature recording unit, as claimed in claim 23, in which said temperature measuring means comprises at least two thermocouple devices, and said thermocouple devices are spaced apart to compensate for any localised variation in temperature.

25. A food temperature recording unit, as claimed in claim 23, in which said body defines an attachment means arranged for positive attachment to a container.

26. A method of recording changes in the temperature of a consignment of goods over a period of time, including packing a hermetically sealed sensor unit with said consignment of goods, using the sealed sensor unit to measure the temperature of said consignment of goods for a very short period of time at predetermined relatively long time intervals, recording within the sensor unit the measured temperature and time data using a source of power within said sealed sensor unit, and subsequently retrieving the temperature and time data from the sealed sensor unit by using a second source of power from outside the sealed sensor unit.

27. A method, as claimed in claim 26, including retrieving the temperature and time data by inductively coupling a separate reader unit with the sensor unit, and using said inductive coupling as said second source of power.

28. A method, as claimed in claim 27, including using said inductive coupling to transmit the temperature and time data from said sensor unit to said reader unit.

29. A method, as claimed in claim 26, including inductively coupling a separate reader unit with the sensor unit, using said inductive coupling as said second source of power and as a data communication means, and initialising said sensor unit to calibrate a temperature measuring means within said sensor unit by reference to an accurate temperature measuring device in said reader unit.

30. A method, as claimed in claim 26, including subjecting said sensor unit to a predetermined temperature, and transmitting a software instruction into said sealed sensor unit to calibrate a temperature measuring means within said sensor unit.

31. A method, as claimed in claim 30, including inductively coupling a separate reader unit with the sensor unit, and using said inductive coupling to transmit said software instruction.

* * * * *